UNITED STATES PATENT OFFICE.

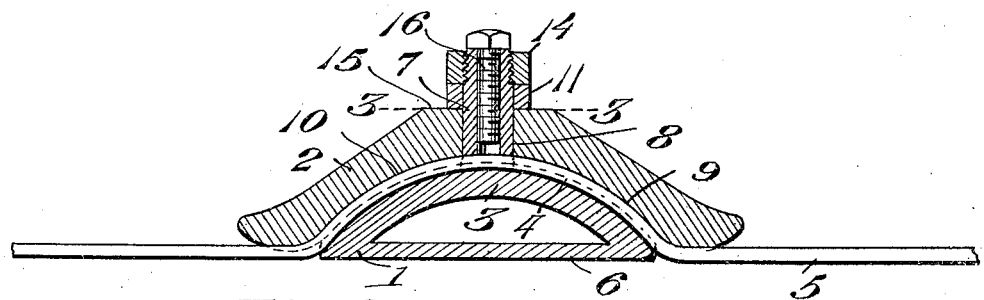

AUGUSTE CARON, OF INDIAN ORCHARD, MASSACHUSETTS.

TROLLEY-LINE CLAMP.

No. 886,942.  Specification of Letters Patent.  Patented May 5, 1908.

Application filed July 25, 1906. Serial No. 327,699.

*To all whom it may concern:*

Be it known that I, AUGUSTE CARON, a citizen of the United States, residing at Indian Orchard, in the county of Hampden and State of Massachusetts, have invented new and useful Improvements in Trolley-Line Clamps, of which the following is a specification.

This invention relates to improvements in trolley line clamps, or devices for holding and supporting the trolley wire, the object of the invention being to provide a simple, cheap, strong and effective device of this character composed of members adapted to firmly grip and hold the wire between them in such a manner as to effectively resist the strains to which clamps of this type are subjected, and in which improved fastening means are employed for uniting the sections so that they may quickly and conveniently be assembled and disassembled.

In the accompanying drawings,—Figure 1 is a vertical longitudinal section of one form of line clamp embodying my invention. Fig. 2 is a vertical cross section of the same. Fig. 3 is a horizontal section on line 3—3 of Fig. 1. Fig. 4 is a view similar to Fig. 1 of a modified form of line clamp. Fig. 5 is a cross section through the lower clamping member thereof, showing the form of receiving notch in the shank or stem. Fig. 6 is a longitudinal section showing a modification in the construction of the lower clamping member.

The device may be constructed of any suitable material, and comprises as essential elements a pair of clamping members 1 and 2. The lower clamping member 1 has a longitudinally curved or convex upper surface 3, preferably provided with a groove 4 for the reception of the line wire 5, the lower face of said member 2 being formed to provide a track surface 6 conforming in general shape to the wire and arranged in alinement with the portions thereof at opposite ends of the clamp, so that the trolley wheel of a car may pass along the joint or point of clamping of the wire in a smooth and easy manner. Extending upwardly from the center of the convex face of the member 1 is a cylindrical shank or stem 7 which passes through an opening 8 in the center of the upper member 2, the lower face of which latter is concaved on an arc concentric with the convex surface of the member 1 and is preferably provided with a coinciding groove 9 for the reception of the wire, which latter is bent between the two members in the form of an offset 10, whereby a firm and secure connection between the clamp and wire is afforded and all tendency to a relative longitudinal shifting movement prevented.

The upper end of the shank or stem 7 is adapted to receive the central eye 11 of a hanger 12 having laterally extending arms provided at their free ends with eyes or openings 13 for connection with suitable supporting or guy wires, and the upper extremity of the stem is threaded for the reception of a nut 14 which clamps the hanger in position against the upper flat face 15 of the member 2. The stem or shank is hollow and internally screw threaded to receive a screw 16 which enters and closes the same, and said stem is also split or provided in its opposite sides with longitudinal slots 17 through which the wire is inserted and removed, the screw 16 being adapted to spread the sections of the shank and thereby force the same outward into binding engagement with the member 2, part 11 of the hanger and the nut 14, thus firmly locking the parts in engagement and preventing all liability of casual disconnection from vibrations or strains. When the wire is clamped between the members 1 and 2 in the manner shown in Fig. 1, it will be apparent that it will be firmly held and the clamp securely fastened in position thereon, thus preventing any possibility of disconnection or shifting of the clamp upon the wire.

In the form of the invention shown in Fig. 4 the shank or stem $7^a$ is formed with a receiving slot $17^a$ having an entrance $17^b$ leading thereto from one of the sides of the shank through which the wire may be inserted in and withdrawn from said slot in a convenient manner. The shank is also split or slotted for the reception of a spreading key or wedge 18 and externally threaded for the reception of a nut 19, the action of the wedge serving to spread the parts of the shank so as to hold the same firmly in binding engagement with the upper clamping member 2 and the nut 19. In this form of the invention the hanger 12 is dispensed with, and in lieu thereof the member 2 is provided with apertured lugs or ears 19′ for connection with the guy wires or supports.

In the embodiment shown in Fig. 6, the lower member 1 has a solid shank $7^b$ extending upwardly therefrom and threaded for the reception of a nut to hold the clamping members in engagement. This simple form of construction may be employed in cases where a firmer connection between the parts is not needed to hold the clamp firmly and securely in position.

Having thus described the invention, what is claimed as new, is:—

1. A trolley line clamp comprising two separable clamping members having grooved arcuate line engaging faces, one of said members being provided with a central aperture and the other member being provided with a threaded shank engaging said aperture and having wire receiving slots; and a connecting nut upon the shank.

2. A trolley line clamp comprising separable upper and lower clamping members having grooved arcuate line engaging faces, the upper member having a central aperture and the lower member having an exteriorly and interiorly threaded shank engaging the aperture and provided with wire receiving slots; a connecting nut exteriorly engaging the shank and a screw interiorly engaging said shank.

3. A trolley line clamp comprising separable upper and lower clamping members having arcuate line engaging faces, the upper member having a central aperture and the lower member being provided with an exteriorly and interiorly threaded tubular shank engaging said aperture and provided with wire receiving slots; a hanger having terminal openings and a central eye engaging the shank; a connecting nut exteriorly engaging the threaded shank and a screw interiorly engaging the latter.

In testimony whereof, I affix my signature in presence of two witnesses.

AUGUSTE CARON.

Witnesses:
 HENRY A. BOOTH,
 FRED. BOURGAUB.